(12) United States Patent
Hollander et al.

(10) Patent No.: US 8,560,893 B1
(45) Date of Patent: Oct. 15, 2013

(54) SYSTEMS AND METHODS FOR AUTOMATICALLY GENERATING EXECUTABLE SYSTEM LEVEL-TESTS FROM A PARTIALLY SPECIFIED SCENARIO

(75) Inventors: Yoav Hollander, Kiriat Ono (IL); Efrat Gavish, Hod Hasharon (IL); Vitaly Lagoon, Newton, MA (US); Matan Vax, Menshe (IL)

(73) Assignee: Cadence Design Systems, Inc., San Jose, CA (US)

( * ) Notice: Subject to any disclaimer, the term of this patent is extended or adjusted under 35 U.S.C. 154(b) by 244 days.

(21) Appl. No.: 13/278,976

(22) Filed: Oct. 21, 2011

(51) Int. Cl.
*G06F 11/00* (2006.01)
(52) U.S. Cl.
USPC .......................................... 714/47.1; 714/741

(58) Field of Classification Search
USPC ........ 714/47.1, 47.2, 47.3, 48, 49, 45, 46, 33, 714/741
See application file for complete search history.

(56) References Cited

U.S. PATENT DOCUMENTS 6,684,359 B2 * 1/2004 Noy ............................... 714/741
2012/0117424 A1 * 5/2012 Ben-Yehuda et al. .......... 714/26

* cited by examiner

*Primary Examiner* — Dieu-Minh Le
(74) *Attorney, Agent, or Firm* — Rosenberg, Klein & Lee

(57) ABSTRACT

A method and system are provided for automatically generating executable system-level tests from an initial action or partially specified scenario by accumulating necessary complement actions and forming a set of constraints required by the initial action and the necessary complement actions. The set of constraints is solved by a constraint solving engine to provide an at least partial sequence of the actions and parameters thereto that satisfies the set of constraints. The sequence of actions that comply with the set of constraints are used to generate an executable system-level test code.

30 Claims, 10 Drawing Sheets

```
component enet_controller {
  rx_buff: place of frame_data;
  ...
  action rx_vid_frames {
    out fd: put rx_buff keeping {
      it.fps_rate <= 24;
    };
  };
};
``` b. Video streaming rate over net can be at most 24 fps

FIG. 3A

```
component cam_controller {
  out_vid_port: place of f/_stream;
  ...
  action stream_vid {
    out fs: put out_vid_port keeping {
      it.resolution in [LD, SD];
    };
  };
};
``` a. Camera can only provide LD or SD resolution

FIG. 3C

```
component display_controller {
  in_port: place of vid_output keeping {
    it.shared == FALSE;
  };
  ...
  action show_vid {
    vs: get in_port;
  };
};
``` c. Display can only receive input from one video processor at a time

FIG. 3B

```
component external_display {
  port: place of vid_output;
  action recieve_vid {
    v: get port keeping {
      (it.color_scheme & 0b1_) == 0;
    };
  };
};
``` d. External display interface supports only a certain color schemes

FIG. 3D

SYSTEMS AND METHODS FOR AUTOMATICALLY GENERATING EXECUTABLE SYSTEM LEVEL-TESTS FROM A PARTIALLY SPECIFIED SCENARIO

BACKGROUND OF THE INVENTION

1. Field of the Invention

The present invention is generally directed to a method and system for automatically generating executable system-level tests from an initial action, scenario, or high-level user goal, generally including a requested action and a model of a Device under Test (DUT). More specifically, the present invention is directed to a method and system of accepting a high level goal, action, scenario, or intent from a user, determining all of the subordinate actions required to enact the goal or intent, combining all of the constraints relating to all of the actions and the Device Under Test (DUT), solving the constraints, and automatically generating executable test code to perform at least one test to accomplish the stated high level user goal.

2. Description of the Related Art

In integrated circuit (IC) design, it is of great importance to be able to quickly, easily, and inexpensively ascertain whether a specific multi-functional device or multi-component device functions as required in real use-case scenarios. At the same time it is very time consuming, difficult, and expensive to individually program executable tests for use with a particular piece of hardware, such as a System on Chip (SOC) as the expertise required to code a specific test for a specific piece of hardware—taking into account all of the vagaries of the individual components and inter connections is very inefficient.

There is therefore an urgent need for a method and system for automatically generating executable system-level tests from at least one scenario.

There is therefore an urgent need for a method and system for automatically generating executable system-level tests from a plurality of scenarios.

There is therefore a need for a method and system for automatically generating executable system-level tests from a partially specified scenario.

There is therefore a need for a method and system for automatically generating execution system-level tests from a very high level simplistic (or partial) specification of a goal (or requested action) from a user.

SUMMARY OF THE INVENTION

An object of the present invention is to provide a system and method for automatically generating executable system-level tests from at least one scenario.

Another object of the present invention is to provide a system and method for automatic generation of execution system-level tests from a partial specification of a test.

Another object of the present invention is to provide a system and method for automatic test generation from a very high level user-specified use-case.

Another object of the present invention is to receive a very high level user-specified use-case, and use a means-ends analysis to determine all of the subordinate or required actions implicated by the use-case necessary to accomplish the use-case.

It is yet another object of the present invention to provide a system and method for accepting a user-specified use-case and a system model to form a plurality of executable tests for execution on a System on Chip (SOC).

These and other objects are attained by a method and system implemented in accordance with the present invention.

A method for automatically generating executable system-level tests from an initial action and a system design includes: establishing a system design defining an interrelation of components, actions the components are operable to perform, and constraints related to performance of the actions. The method receives at least an initial action from a user. A constraint satisfaction problem (CSP) is generated to include a set of requisite actions which are automatically added to the initial action responsive to an evaluation of the system design to thereby determine other actions required to perform the specified initial action. The initial constraint and a set of constraints accumulated from each action of the set of requisite actions are also added to the CSP. The CSP is then solved to thereby simultaneously satisfy the set of constraints and schedule the actions. An executable system-level test is then generated by assembling the initial action and the set of requisite actions in an at least partial order responsive to a solution of the CSP, wherein the executable system-level test includes executable code operable to perform a verification test on a system represented by the system design.

Another exemplary embodiment provides a method for automatically generating executable system-level tests from a scenario and a system that includes: establishing a system design that includes a plurality of components, actions the components are operable to perform, and constraints related to the actions. An initial test scenario is created to include at least one action. A set of constraints relating to the initial test scenario and the base model of the design are accumulated. An expanded test based on the base model and the initial test scenario is automatically generated. The expanded test is generated to satisfy the set of constraints. An executable test code based on the expanded test is generated where the executable test code is operable to perform at least one simulation on a processor.

Another exemplary embodiment provides a system for automatically generating executable system-level tests from an initial action and a system design. The system includes a storage module to store at least one system design including a plurality of interrelated components, actions the components are operable to perform, and constraints relating to the actions. A computer processing unit is operably coupled to the storage module and includes: a test elaboration module, a constraint solver module, and an executable compiler module. The test elaboration module is operable to determine relationships between the initial action and necessary complement actions of the base model in the storage module; form a set of constraints related to both the initial action and the necessary complement actions; and generate a constraint satisfaction problem (CSP) relating to the initial action, necessary complement actions, and the set of constraints related thereto. The constraint solver module is operable to solve the CSP to form an elaborated test to include a sequential arrangement of actions and parameters thereto, wherein the elaborated test satisfies the set of constraints. The executable compiler module is operable to generate executable test code from the elaborated test. The executable test code is executable on a processing unit to perform a simulation of a plurality of actions on the design.

BRIEF DESCRIPTION OF THE DRAWINGS

FIGS. 3 A-3D are exemplary system level notation (SLN) code excerpts defining components, actions, and constraints;

DETAILED DESCRIPTION OF THE PREFERRED EMBODIMENTS

In the design, implementation, and verification of multi-component systems of integrated circuits, such as systems on chip (SOC), it is essential to accurately, quickly, and inexpensively provide for comprehensive system-level tests of the SOC or other integrated system that simulate real-world high-level use-cases without requiring manual programming of these individual tests. Further complicating matters, these tests must often be programmed specifically for each particular system to be executed on which would require great amounts of time from very highly-specialized system or chip designers and engineers. Typically, system designers, software engineers, and functional verification engineers have had to go to great lengths to individually code executable system-level tests to run use-cases on a System on Chip (or SOC). These engineers and designers would need to be intimately familiar with the individual layout, components, elements, and various Intellectual Property (IP) interconnected within the SOC. The same, very valuable designers, would need to individually tailor the code for optimization and execution on a particular system, written specifically for a particular SOC, and manually account for conditions and various types of constraints on the SOC or device. However, such menial test generation by system design engineers is so time consuming, difficult, and expensive as to be impractical.

Figure 10:
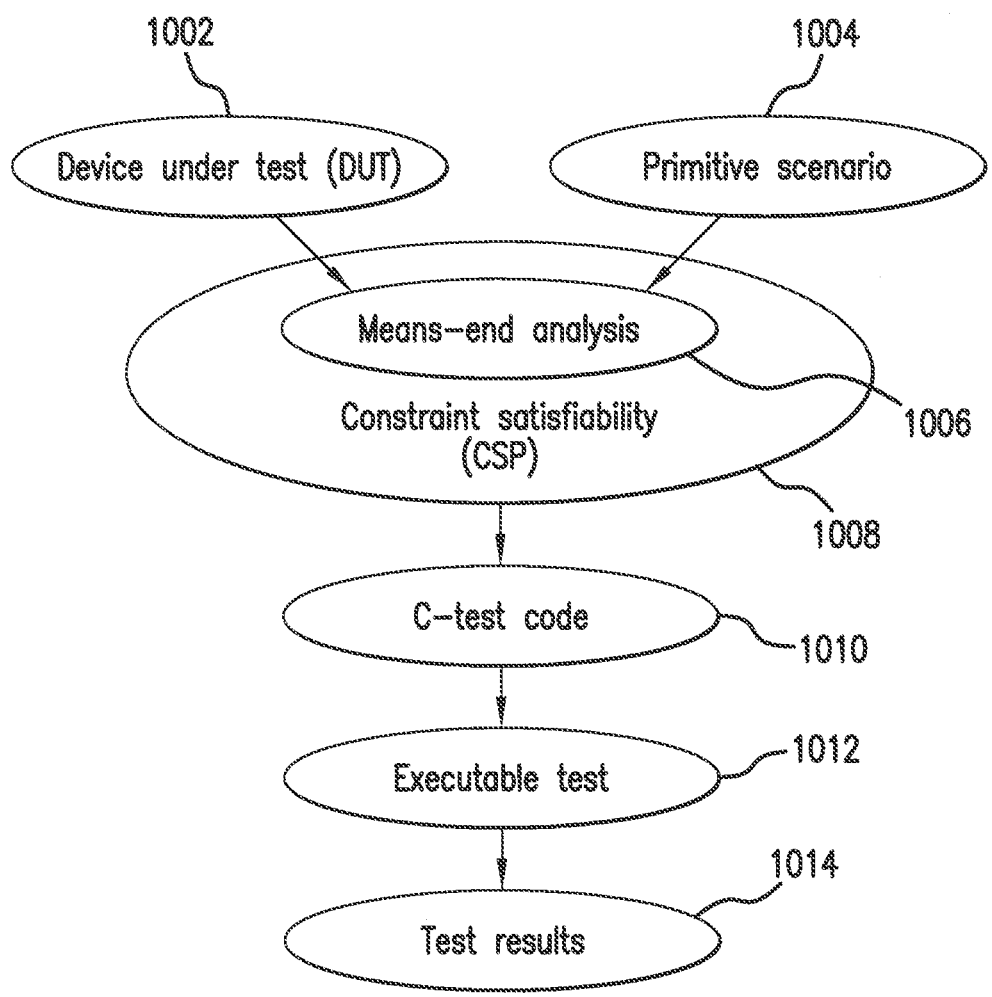
FIG. 10 is a simplified flow diagram in accordance with an embodiment of the present invention.

In accordance with an embodiment of the present invention, and as seen in FIG. 10, a system and method for automatically generating executable system-level tests from a scenario, partial specification, intent, goal, initial action (used interchangeably herein) is provided. In broad concept, a simplified model or system design, including a topology of a Device under Test (DUT) and a functional description of the components of the DUT, is provided along with at least a partial specification of a scenario, initial action, goal or other such initial direction as provided by a user.

A Constraint Satisfaction Problem (CSP) is formed by performing a means-end analysis on the initial goal or action to determine what other constituent actions need to be performed to at least substantially comply with the specified goal of the user. The collection of actions necessary to perform the initial action or goal are assembled with all of the constraints and conditions into the CSP. The CSP is preferably constructed in high level e-code or any other such high-level constraint-capable language. The constraint satisfaction problem (CSP) is then transformed from e-code into a Boolean logic formula and is then solved by a constraint solving engine, such as a CSP/SAT satisfiability solver. This could potentially reside on an external server and may be communicated across a computer network. The CSP, once solved, results in an at least partially scheduled sequential arrangement of the initial action and the requisite constituent actions along with parameters or attributes of the actions that satisfy all constraints and accomplish the goal or intended scenario of the user. Such sequential arrangement and parameters which comply with the constraints are then used to automatically generate a C-code or a machine executable code for tests to be executed, preferably on the simulated SOC or other such processor.

Figure 1:
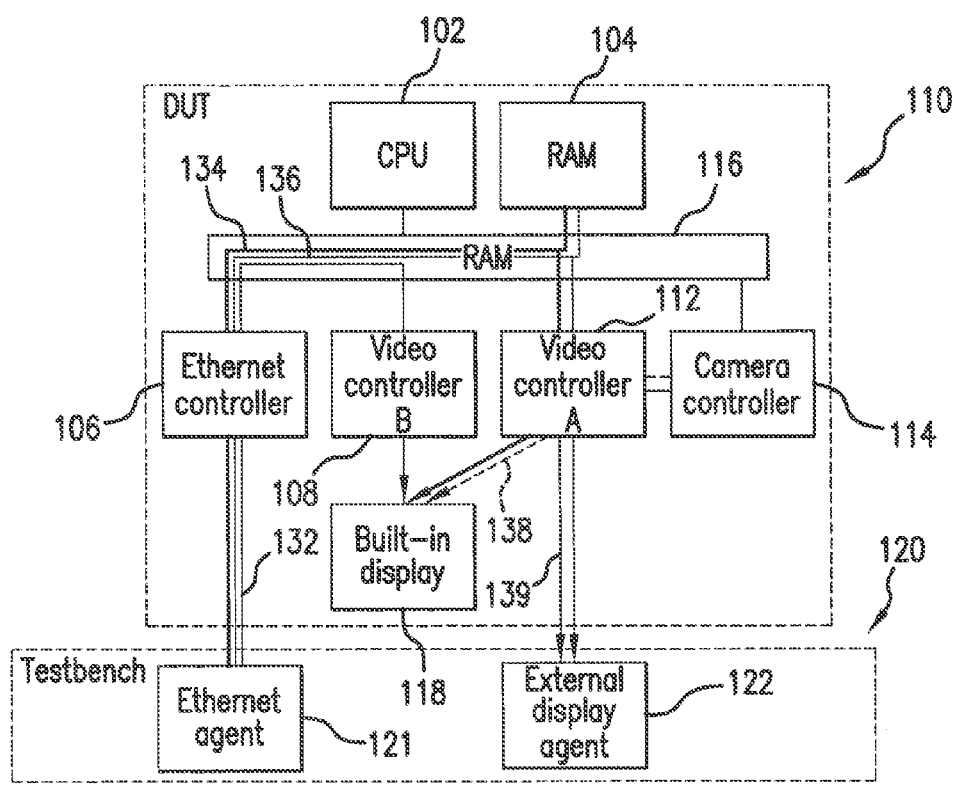
FIG. 1 is a simplified schematic diagram of a system in accordance with an exemplary embodiment of the present invention showing a plurality of intended data paths from individual components in a Device under Test (DUT) interfacing with a test bench.

FIG. 1 illustrates a simplified schematic diagram of an arrangement for executing system verification tests, a Device under Test (DUT) 110 operable to executable test code and a test bench 120 device operable to communicate and provide input and receive output from the Device under Test 110. DUT 110 is a device of integrated circuits and interrelated interconnected components illustratively including CPU 102, RAM 104, Ethernet controller 106, video controller B 108, video controller A 112, camera controller 114 and a built-in display 118, all interconnected by a general purpose Bus 116. At least the Ethernet controller 106 and video controller A 112 are each provided a separate means of ingress and egress 132 and 139 respectively to provide output and receive input from an external agent such as test bench 120. Test bench 120 provides two exemplary modules: Ethernet agent 121 and external display agent 122. The Ethernet agent 121 preferably serves to provide simulated input to an Ethernet controller 106 within Device under Test 110 and also receive output from the Ethernet controller 106. The external display agent 122 of the test bench 120 is meant to simulate an external display to thereby receive input from video controller A 112 and potentially return checksum or confirmation information via external display agent 122 back to video controller A 112.

The Device under Test 110 may be an actual physical embodiment of the device, or it may merely be a software representation of such a device having individual components defined, data paths therethrough, actions, constraints, and pre/post conditions. Likewise, test bench 120 may also be an actual physical embodied device such as a Field Programmable Gate Array (FPGA) or, more preferably, it may simply be a software or data representation thereof as it is merely a verification artifact. In either case, Device under Test 110 is provided with a plurality of intended data paths such as video flowing from an external Ethernet into Ethernet controller 106, to Bus 116, RAM 104, video controller A 112, and terminating at built-in display 118. Such a data path 134 may represent the flow of video from an external Ethernet or network server through the Ethernet controller, the Bus, into the memory for decoding and storage, then through a video controller A for eventual display on the built-in display 118.

Another exemplary data path is data path 136 whereby data may flow from an external Ethernet agent 121 representing a broader internet or network where data may be stored on an external server brought in through Ethernet controller 106 to the Bus 116, to RAM 104, and then to display externally through video controller A 112 to the external display agent 122. Yet another intended data path 132 may receive input from the Ethernet, pass through Ethernet controller 106, Bus 116, video controller B 108, and terminate through built-in display 118. Yet another intended data path 139 traverses from camera controller 114 through video controller A 112 and passes directly to the external display agent 122.

Figure 2:
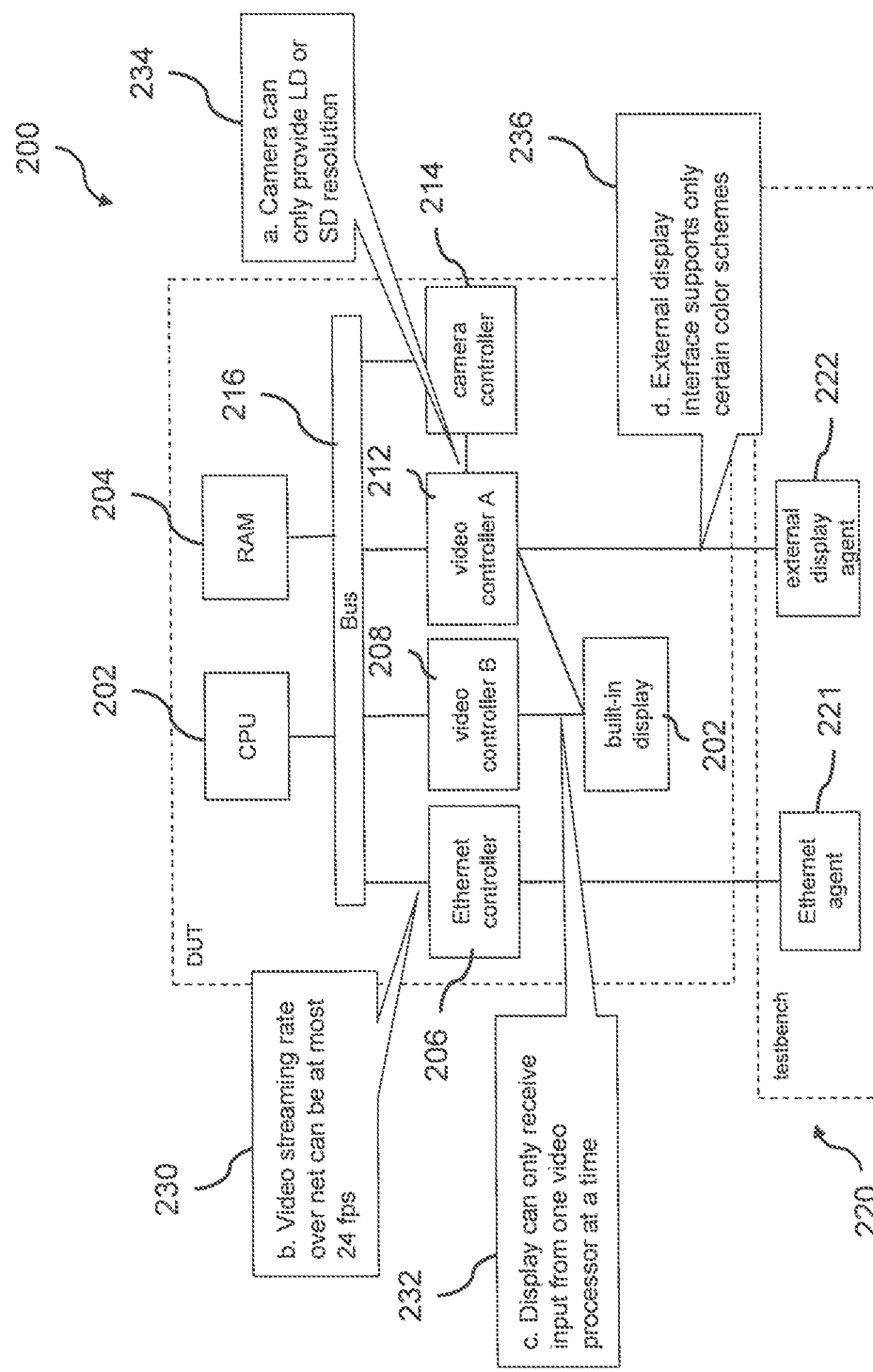
FIG. 2 is another simplified schematic diagram of a system in accordance with an exemplary embodiment of the present invention, showing several exemplary constraints on data paths, actions, and/or resources.

FIG. 2 illustrates another exemplary, though simplified, schematic of a Device under Test interfacing with a test bench device, as seen in FIG. 1. The test bench device is optional as many tests may be performed entirely within the Device under Test itself. In the simplified schematic, it is seen that a Device under Test 200 contains a plurality of interconnected components such as CPU 202, RAM 204, Bus 216, Ethernet controller 206, video controller B 208, video controller A 212, camera controller 214 and built-in display 218. The test bench (optional) includes another plurality of interconnected components including Ethernet agent 221 and external display agent 222. Test bench 220 is operably coupled to the inputs and outputs of the Device under Test 200. Such an operable coupling provides for the test bench to provide stimulus or input to the Device under Test 200 and also receive output or results from the Device under Test 200.

It is further illustrated in FIG. 2 that a plurality of constraints limit the actions or attributes of different components within Device under Test 200. For example, constraint A 234 contains a limitation upon the camera controller 214 and the video controller 212 which receives input from camera controller 214. The exemplary constraint or limitation provides that the camera is only able to provide low definition (LD) or standard definition (SD) resolution video. Such constraint, preferably captured in system level notation (SLN) for the device or scenario may provide input to a means-end analysis as such: if it is known that the camera (according to constraint A node 234 in FIG. 2) may only provide low definition or standard definition resolution then it can be ascertained by the means-end analysis that if high definition (HD) is required, then such high definition video may not be from the camera controller 214 as it is only able to provide low or standard definition video. Such analysis may seem trivial, but considered in aggregate with possibly dozens (or hundreds) of such architectural constraints (many of which, the test writer may not even be aware of), factors, and pre-conditions, and combined with a model of the Device Under Test or SOC in system level notation, may provide for automatic test generation with merely the provision of a scenario and intended goal or initial/requested action provided by a user.

An additional constraint, constraint B 230, may provide that any video streaming over the Ethernet controller or Ethernet itself may not exceed 24 frames per second (FPS). Such constraint may act on Ethernet controller 206, video controller B 208 and/or video controller A 212. Indeed, it may have ramifications for camera controller 214 inasmuch as if a video stream (in excess of 24 frames per second) is to be streamed through the system, then through process-of-elimination, as the Ethernet controller cannot be implicated, it must be that either the video resides on the Device Under Test in RAM 204 or the video must come from the camera controller 214 (provided that no other relevant constraint limits this frequency of display). A user, for example, may specify a scenario such as: "play high frequency video at 30 frames per second." Constraint B 230 (FIG. 2) would inform that such a video cannot be captured through the Ethernet controller 206 but must instead either come from RAM 204 or camera controller 214 according to the system topology or Device Under Test representation. When such action/condition definitions, model representation, and constraints are input into a means-end analysis along with an intended goal of a user, a constraint solving engine, such as a SAT Solver, is preferably used to decipher and transform the scenario and/or goal along with the model and constraints acting thereon to formulate a more specific, fully elaborated, and comprehensive series of actions to be performed to achieve the goal while not violating constraints specified (or implicated).

Another exemplary constraint is constraint C 232 which essentially states that the display can only receive input from one video processor at a time. Such constraint 232, when viewed in combination with the system topology of Device under Test 200, informs that the built-in display 218 is only able to receive input from video controller B 208 or video controller A 212 at a time. In the absence of the constraint, the system or test may indeed schedule for concurrent display through built-in display. However, as constraint C 232 informs, such test would be illegal and indeed only either video controller B 208 exclusive-or (XOR) video controller A 212 output maybe provided to the built-in display 218. In other words, only video output from one of video controller A or B may be displayed on the built-in display 218 at a given instant. The means-ends analysis, from this conclusion, may, when presented with instructions to concurrently display video on controller B 208 and video controller A 212 result in the means-ends analysis artificial intelligence automatically determining to display the output of video controller B 208 to built-in display 218 while providing video controller A 212's output to the external display agent 222. Such an arrangement of video output remains legal while not violating constraint C.

A final exemplary constraint is constraint D 236 which essentially states that the external display interface supports only certain color schemes. The artificial intelligence means-ends analysis, when faced with such a constraint, may determine that if a video source is of a different color scheme than a supported one, that it needs to be re-routed to built-in display 218 to be displayed.

Figure 9:
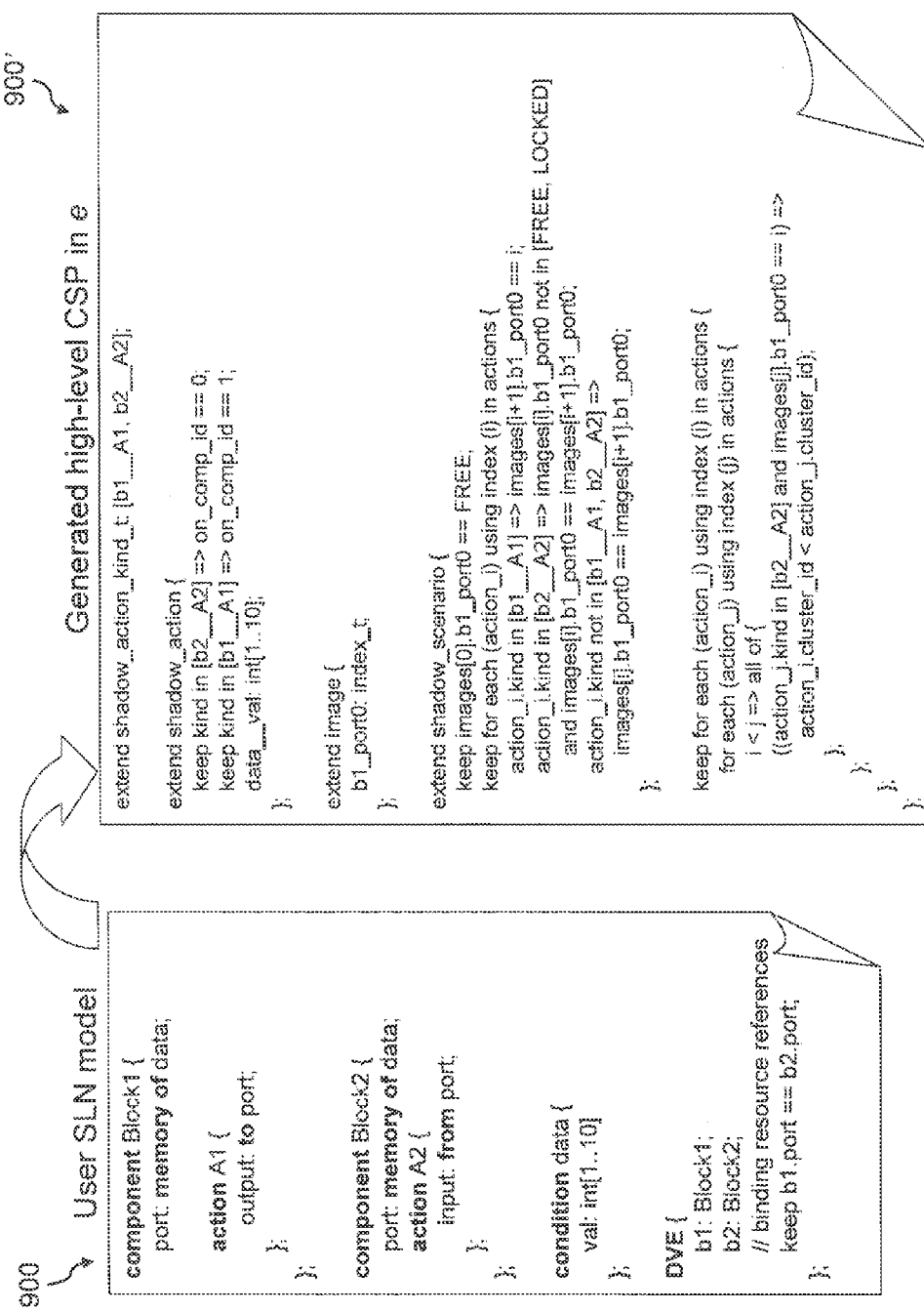
FIG. 9 is a simplified flow diagram showing an exemplary or illustrative simplified scenario defined by a user SLN model being generated or transformed into a high-level constraint satisfaction problem in e-code in accordance with several embodiments of the present invention.

FIG. 3A is an exemplary illustration of a portion of system level notation (SLN) code that may be used to construct a scenario, goal, or initial action to be used in automatically constructing a fully elaborated executable test. SLN may also be used to form a topology description or model of a Device Under Test (DUT) such as an SOC. By defining a component 302 such as the Ethernet controller 306 or Ethernet controller 206 (as seen in FIG. 2), the topology, and the system design by extension, can be piecewise constructed. Such individual components may be defined in terms of their function, actions, parameters, input, and output in forming a functional description of the device. A user defines each action, which conditions it requires, and which conditions it provides. These conditions themselves may be parameterized with scalar attributes that can be constrained by the producing/consuming action. Conditions may be specified using, for example: "from" and "to" constructs (as seen in FIG. 9).

In System-Level Notation (SLN), constraints are expressions of properties (e.g. equalities, inequalities, greater, lesser ... etc.) over scalar attributes or scheduling directives that are generally prefixed with the 'keep' or 'keeping' keywords. A constraint may be seen as a property that must be satisfied in an attribute, set of attributes, or sequence of actions.

An Action is defined as any operation performed by the Device Under Test (DUT) or Verification Environment (VE) during a test. Such actions may need to be controlled by or visible to a test writer or monitor of test results. Actions include:

a) primitive action which is implemented directly by the user in terms of C code and are executed during one continuous stretch of time and within one component; and, b) compound actions which consist of other actions and possibly spanning multiple time slots and possibly multiple components.

A scenario may typically be specified in terms of a compound action.

A Condition may be a system state, streamed data, stored data, or notification produced by one action and accessed by others. By requiring some condition, an action may force other actions with certain properties to occur prior to it or contemporaneously therewith. Given a requested action, fulfilling its conditions may involve pulling into the scenario other actions- and their conditions may pull in yet more actions. A legal scenario may be a bipartite graph of actions and conditions.

An attribute may be a parameter of an action or a condition represented as a scalar constant (numeric, Boolean, enumerated, or the like).

It is seen in FIG. 3A that at least one action 304, such as receiving video frames "rx_vid_frames" is defined. Such definition may include individual commands or sub-actions forming the greater action of receiving video frames. Conditions serve to functionally limit actions and/or attributes, and illustratively include "out_fd:" which includes another condition: "put" 305 the "received buffer" (a location or resource) and a constraint 309 "keeping IT.fps_rate less than or equal to 24." Such a constraint serves to limit the actions of the component Ethernet controller 306 by mandating that the video frame rate cannot exceed 24 frames per second.

FIG. 3B shows another illustrative or exemplary portion of SLN code. Such portion of SLN code, in this instance, is defining a component of the SOC, the display controller 318 (built-in display 218 as seen in FIG. 2). Such display controller 318 is further defined to include an in_port, suggesting that an input port is provided. A constraint "keeping IT.shared=false" provides that the display can only receive input from one video processor at a time. An action is further defined in SLN for the display controller 318 to include an action "show_vid" 320 which may function to display video out.

FIG. 3C is another exemplary portion of SLN code, in this instance, defining a "cam_controller" 314 component which corresponds with the camera controller (seen as element 214 in FIG. 2). The cam_controller 314 is defined to include at least one resource, the "out_vid_port," which defines the camera controller to have an output video port. Still further, the action "stream_vid" 316 is defined to include at least one sub-action and at least one constraint 317 such as "IT.resolution in [LD,SD]." Such constraint in this case is provided to limit the resolution of the camera to only provide low definition (LD) or standard definition (SD) resolution.

FIG. 3D is another exemplary portion of SLN code used to define another component, in this instance the external display agent 312. The component is defined to include at least one output port as well as an action, "receive_vid" 315. As in the other components, a constraint is imposed upon the type of actions, the input provided, and/or the output provided. Such constraint 313 in this case constrains the possible universe of color schemes that the output display may provide.

Figure 4:
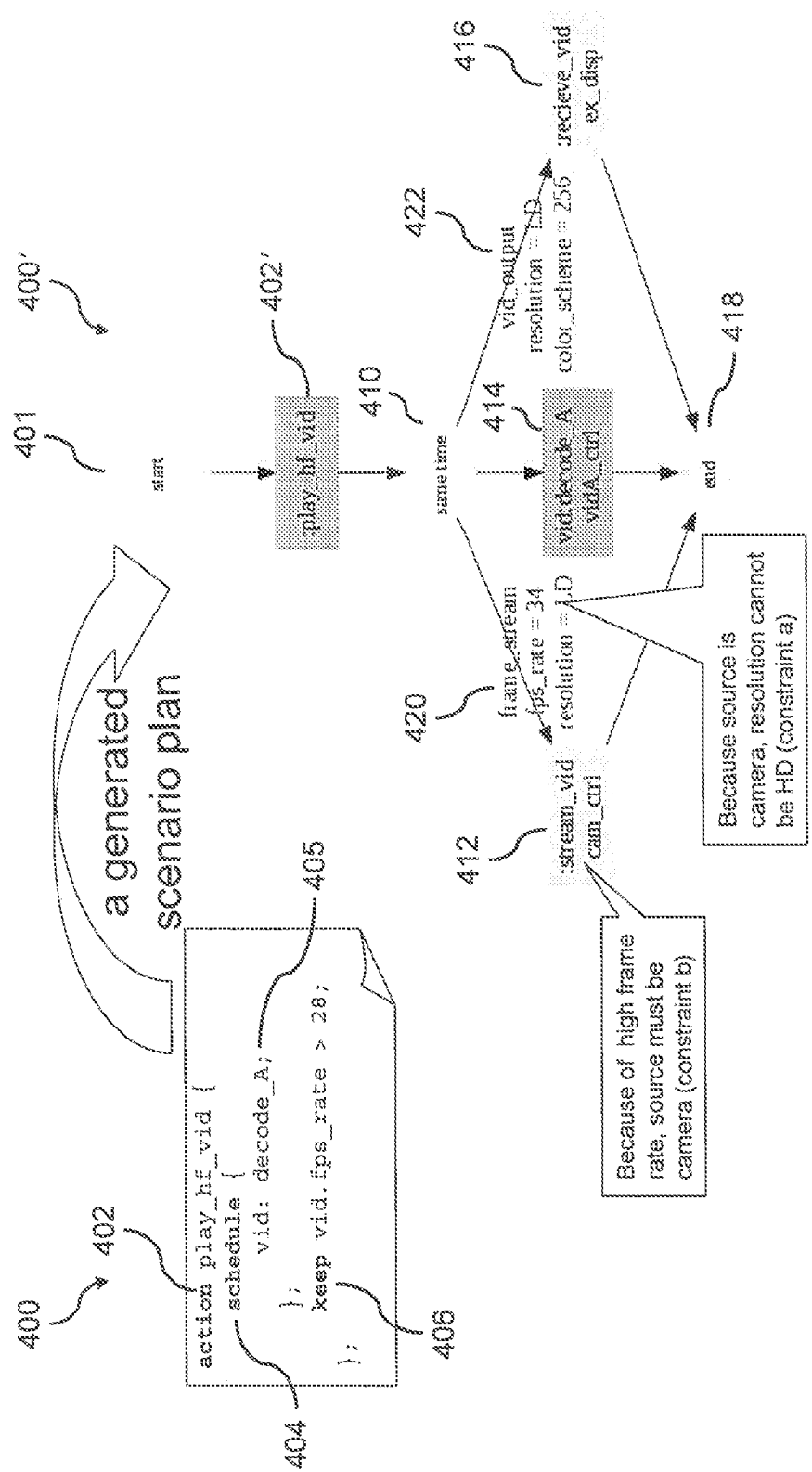
FIG. 4 is a simplified flow diagram of a method for automatically generating executable system-level tests from a scenario in accord with an exemplary embodiment to the present invention, showing an illustrative scenario being generated into a fully executable system-level test.

FIG. 4 is a simplified flow diagram of a transformation from a user specified SLN 400 to a fully elaborated executable test scenario 401'. A user provides a scenario 402 including at least an action with, potentially, a time constraint 404 thereby scheduling any simultaneity or sequential nature of the test to be performed 405 and also any number of other constraints 406, such as: e.g. the video frame per second is kept above 28. The scenario plan 400' shows an illustrative simplified flow diagram of a fully elaborated executable test as automatically generated from the user specified scenario 400. The fully elaborated test scenario 400 begins with a starting node 401 and progresses to a play_HF_vid 402' node as defined by the scenario provided by the user 402. Any simultaneity or sequential requirements, as provided by the user at the scenario stage 400, may be reflected using a "same time" construct 410 which specifies and enforces the concurrent processing of different actions or sub-actions. In this instance several sub-actions of the play_HF_vid 402' action include the streaming video camera control 412; vid:decode_A vid A_control 414; and receive_vid x_display 416. The sub-action "vid:decode_A" is an explicit sub-action as it is explicitly defined in the scenario 400, while ":stream_vid" and ":receive_vid" are both implicit sub-actions which may emerge as a result of conditions and constraints in the means-ends analysis/formulation of CSP.

In this exemplary scenario solution, the implicit sub-actions are pulled in because of conditions of the explicitly requested action—decode_A—as defined in the system model/base model/system design (used interchangeably herein). The relevant definitions that figure in the solution in FIG. 4 are in the code below in bold. They are two: an input condition ('from in_buff' in one case and 'from in_stream' in the other), and an output condition ('to vid_if'). These condition requirements inform the solver to pull into the solution the producer action for the input and consumer action for the output. Constraint 406 restricts the range of possibilities in this respect to the camera variant.

```
action decode_A {
  ...
  action decode_A {
    ...
    display_kind: [MEM, MEM_EXT, CAM, CAM_EXT];
    ...
    when MEM_EXT {
      fd: from in_buff keeping {...};
      vs: to vid_if keeping {...};
    };
    when CAM_EXT {
      fd: from in_stream keeping {...};
      vs: to vid_if keeping {...};
    };
    ...
};
```

The means-ends analysis may look to the scenario 400 (specified by the user to have a constraint 406) whereby the video frequency or frame rate is kept above 28 frames per second. Such constraint, in keeping the video frames above 28 frames per second, would inform the artificial intelligence or means-ends analysis that inasmuch as constraint B, specified in FIG. 3 constraint 309 (the frequency of video streamed over the Ethernet controller cannot exceed 24 frames per second)—that the video frame rate of 28 and above cannot utilize the Ethernet as the source of the stream and instead must look to an alternate source of the stream which could be the memory 204 as seen in FIG. 2 or the camera as seen in node 214 of FIG. 2. Thus, as the source cannot be the Ethernet controller—in keeping with constraint B, the source must indeed be the camera controller. Also, in keeping with constraint A, as defined in FIG. 3A, the camera cannot output high definition video and therefore any test generated that satisfies both constraint B and constraint A would therefore require that video coming from the camera not be of high definition, but instead be either low definition or standard definition. Such is seen in the generated code 420 which will eventually be completed and transformed into executable test code. Further, where test video 422 is such that the color scheme is 256, the artificial intelligence of the means-ends analysis may conclude that the display must be generated and provided to the external display which satisfies such a constraint.

After performing the series of operations specified in the "same time" construct 410, the scenario plan ends at node 418.

Figure 5:
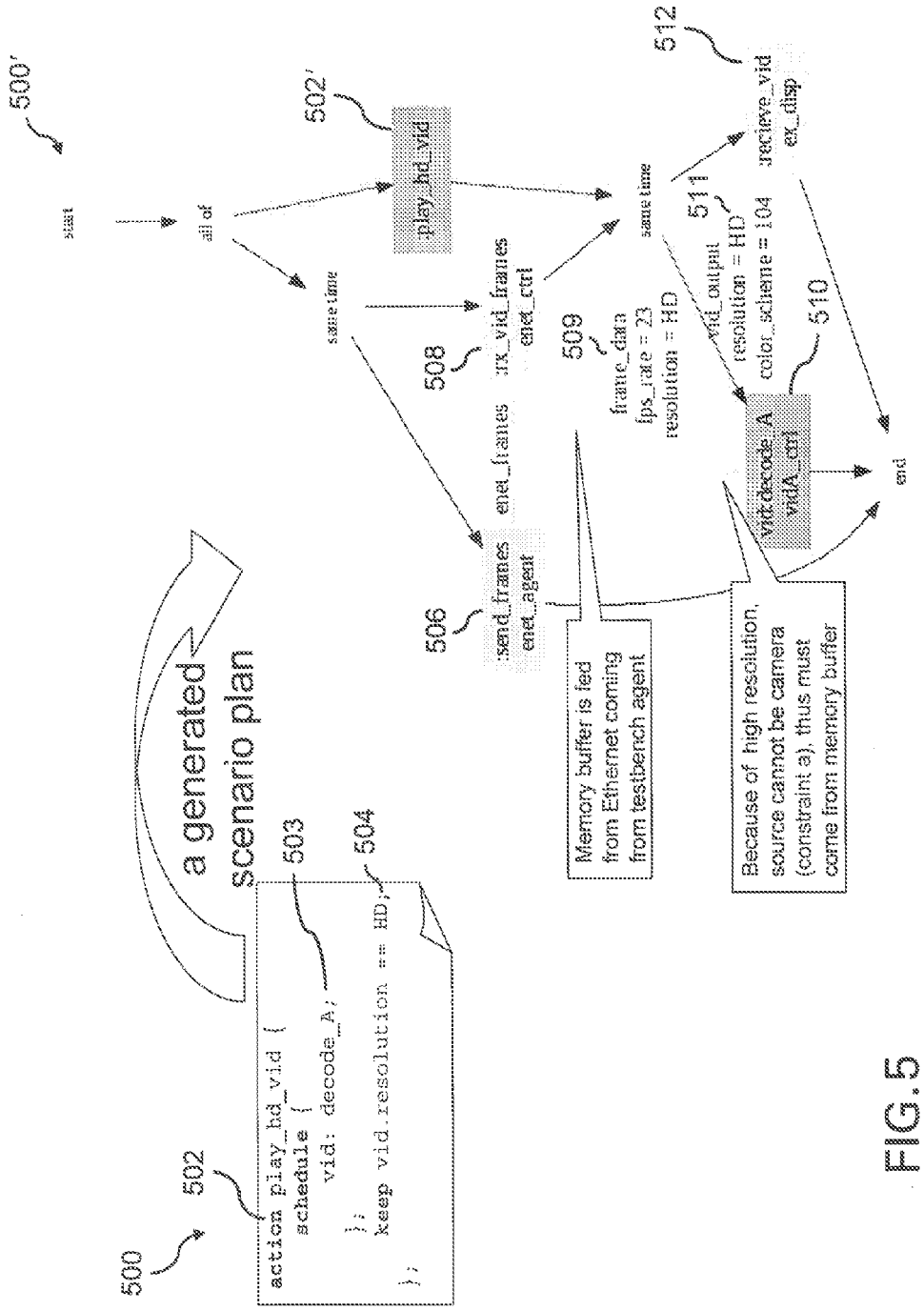
FIG. 5 is another simplified flow diagram showing another illustrative executable test generation from a user-specified scenario in accordance with another exemplary embodiment of the present invention.

FIG. 5 shows another exemplary transformation from a scenario 500 to a fully elaborated scenario plan 500'. The scenario begins with a definition of an action 502. In this instance, the action is play_HD_vid which describes a scheduling constraint, "video decode_A 503," and a scalar constraint "keep vid.resolution=HD." The scalar constraint "keep vid.resolution=HD" 504 sets the resolution for the video to be high definition quality. As is seen in node 234 of FIG. 2 and node 317 of FIG. 3C, a constraint exists whereby the camera controller is only able to supply low definition or standard definition video, and therefore, the artificial intelligence or means-ends analysis must conclude, for example, that inasmuch as the scalar user constraint 504 mandates high definition video, that the camera cannot be the source of such video. Having excluded the camera as the source of the high definition video, the artificial intelligence of the means-ends analysis would therefore likely conclude that the Ethernet stream must be the source of the video. Therefore it is seen that the means-ends analysis has constructed a scenario plan 500' that includes two same-time actions 506: 1) the sending of the frames from the Ethernet agent of the test bench, and 2) to the receiving of the video frames by the Ethernet controller 508. In this instance, the elaborated scenario plan may include C code which essentially elaborates on the specifications of the video to specify that the frames per second rate equals 23 and the resolution equals HD at node 509. The means-ends analysis, when fed a scenario and/or a scalar constraint may have many possible solutions or scenario plans that are legal according to the device, scenario, intent, or goal, and the constraint provided. As such, a plurality of scenario plans may be generated and they may all be executed, or, only a select few may be chosen. Such selection of legal test plans may be chosen based on a random or pseudo-random selection with a changing seed value.

At step 510 the legal video is provided to a decoding action "vid:decode_A vidA_ctrl" 510 which will decode the video through video decoder A via the Ethernet controller 508, and the decoded video may then be passed on to the external display 512. In this instance, though, it is important that the AI or means-ends analysis consider all of the constraints previously placed such as constraint D as seen in FIG. 3D and also as seen in node 236 of FIG. 2. As such, if the video is to be passed to the external display 512, then constraint B would constrain the possible color schemes of the video. In this instance it is seen that the legal test code generated at node 511 limits the color scheme to 104 which may specify a palette numbering or, bits to be used to record color depth. For example, an 8-bit color depth may only represent 256 colors whereas a 16-bit color depth may provide 65,536 colors.

Figure 6:
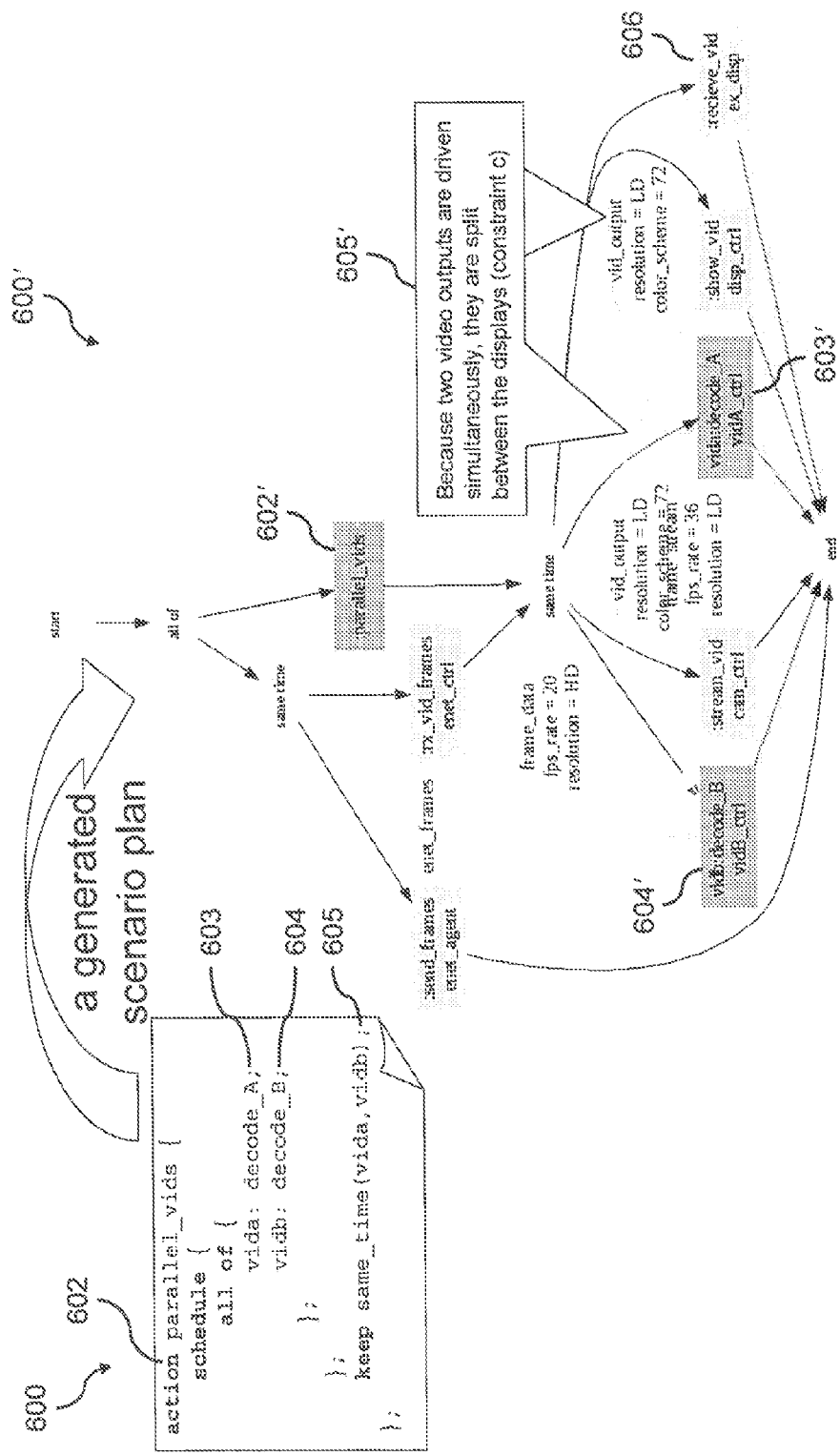
FIG. 6 is another simplified flow diagram illustratively showing the automatic generation of a fully executable system-level test generated responsive to a partial specification of a test in accordance with an embodiment of the present invention.

FIG. 6 shows another exemplary transformation of a scenario 600 to a fully elaborated or expanded scenario plan 600'. The scenario 600, in this instance, defines an action "parallel_vids" 602, which essentially captures a user's high level use case intent, goal, or initial action. The parallel_vids scenario 602 includes a timing constraint or sequential schedule which includes "vid A" 603 and "vid B" 604, each of which decode separate videos. Another scalar constraint from the scenario is defined as "keep same_time (vid A, vid B)" 605. Such temporal, planning, or sequence constraint may signify in the system level notation (SLN) that both videos are to be decoded simultaneously. Therefore, the fully elaborated or expanded scenario plan 600' begins with "all of" and "same time" constructs which may trigger the means-ends analysis to initiate a sending of Ethernet video frames from the test bench to be received by the Ethernet controller of the Device Under Test and execute "parallel_vids" 602' creating tests which may be in C code. An example of the C code tests would be that the "frame_data fps_rate==20" where the resolution is set as HD or high definition. Inasmuch as the two videos: vid A and vid B are to be decoded and output simultaneously, the intelligence of the means-ends analysis may interpret constraint C (defined in FIG. 3B and at node 232 of FIG. 2) to say that inasmuch as a display can only receive input from one video processor at a time, but yet the two videos are to be decoded and displayed simultaneously, then a logical conclusion must be that both the internal and the external displays are to be utilized. To extrapolate further, inasmuch as the two video streams are to be output simultaneously to two separate displays, one of which must be the external display and it is known from constraint D of FIG. 3D or node 236 of FIG. 2 that the external display can only display certain color schemes or color depth, then another logical conclusion would be that the video to be displayed on the external display must be constrained to a compatible color scheme or color depth. It is seen that the same-time construct is used to execute "vid B decode_B" action at the vid B_controller 604' while simultaneously executing "vid A:decode_A" at the vid A controller 603' simultaneously. The decoded video will be output concurrently to the external display 606 and the display controller 607.

Another, slightly modified, exemplary action or scenario may include:

```
action parallel_vids2 {
    schedule {
        all of {
            vida: decode_A;
            vidb: decode_B;
        };
    };
    keep vida.resolution == HD;
    keep vidb.fps_rate == 28;
    keep same_time(vida, vidb);
};
```

It is seen in the exemplary action above that the parallel_vids2 action contains two sub-actions: decode_A and decode_B and three constraints affecting the resolution, frame-rate, and simultaneity of decoding, all prefaced by the 'keep' construct.

Figure 7:
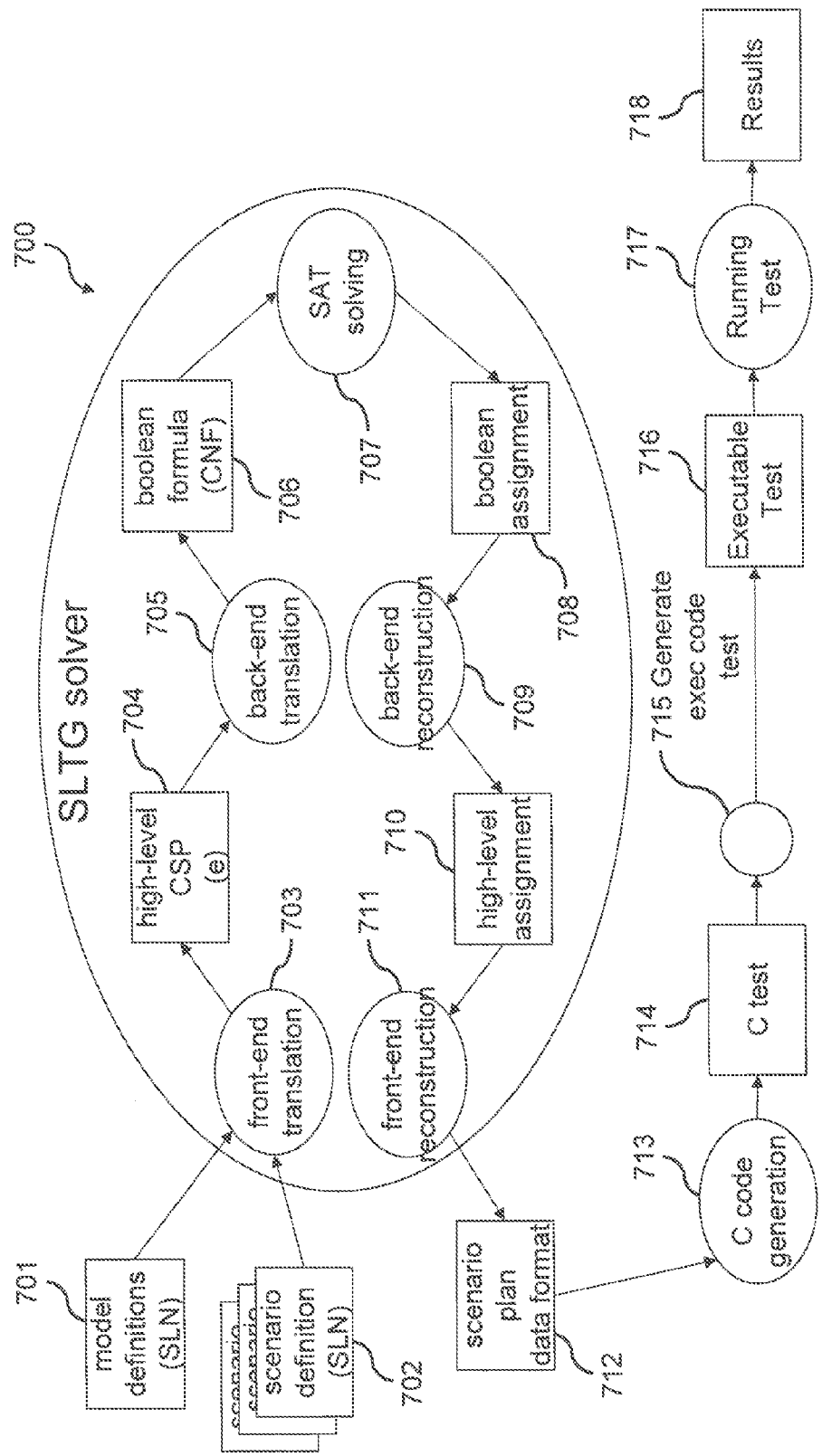
FIG. 7 is a simplified flow diagram of a system for automatically generating executable system-level tests from a scenario or scenario definition (SLN) and a model definition or component topology description in accordance with another aspect of the present invention.

FIG. 7 shows a simplified flow diagram of a method for automatically generating executable system level tests in accordance with an embodiment of the present invention.

More specifically, FIG. 7 illustrates an exemplary path from abstract user terms to Boolean formula to be operated upon by the constraint solving engine, and back to user terms to serve as input in the executable test code generation stage. The method 700 includes providing a model definition, which includes a topology definition for an abstracted Device under Test (DUT) 701, definitions of actions, conditions, attributes, and constraints; and at least one scenario definition (a plurality are preferably supplied), preferably in system level notation (SLN) 702. The user may provide a single scenario or a plurality of different scenarios 702 to the system level test generation (SLTG) solver 700. Both the model definition 701 and the scenario definition 702 (both preferably in SLN—although any language operable to express, describe, and model the DUT, actions, conditions, attributes, attribute constraints, and the like may suffice) to the front end translation 703 which may transform the user readable high level use cases and high level abstracted system topology definitions from SLN to a high level CSP through a compiler step. Such a compiler step may employ a meta-model and data structures representing the syntactic structures of the input which will be transformed to create an output CSP, preferably in e-code. Front end translation 703 generally performs several steps in transforming the user model to a CSP model—applying the SLN modeling constructs, including:

1) Parse the input SLN code and construct an abstract syntax tree;
2) Traverse the syntax tree and construct a meta-model of action and condition types with their respective attributes and constraints; and,
3) Traverse the meta model and generate code defining the high level CSP.

This frontend translated combination of the system model, topology, and scenario definitions will be provided in a high level CSP which is preferably e-code. The e-code CSP constraint satisfiability problem (CSP) 704 essentially combines the DUT, model definition, and system topology, with the scenario definitions to thereby assemble the topology based constraints, the scheduling or planning based constraints, and the user or scalar based constraints into a comprehensive listing of requirements for an executable test. The high level CSP in e-code 704 will then be processed through back-end translation 705 to arrive at a Boolean formula in Conjunctive Normal Form (CNF) 706. Essentially, the Boolean formula CNF is a mathematical formula which combines a comprehensive listing of all of the different topology, planning, and scalar constraints, as specified in the model definitions and scenario definitions. Back-end translation 705, in transforming the high-level CSP to a low-level logical formula of Boolean variables in conjunctive normal form (CNF) which can be provided to the constraint solving engine or SAT solver, generally performs several steps, including:

1) Parse and analyze the e-code and construct a syntax tree;
2) Traverse the syntax tree and construct a meta model of structs (classes), fields, and constraints; and,
3) Traverse the meta-model and create a representation.

Once the Boolean formula (CNF) 706 has been formulated, it is passed on to a SAT solving node 707 which is a satisfiability of constraints solver or constraint solving engine. The SAT solver essentially attempts to arrange, sequentially, all of the different actions, sub-actions, conditions, and constraints into a solvable sequence while meeting all constraints as specified.

It will either pass along at least one sequence which meets the specified criteria or return a failure or error code specifying that such solution is not possible. In the event that the constraints are satisfiable, a Boolean assignment 708 is created which is then passed on to another process, a back-end reconstruction process 709 which will translate the Boolean assignment into a high level assignment 710 which should again be human-readable in high-level CSP (essentially comprising structs, arrays, numeric variables, and enumerated variables). The back-end reconstruction process 709 reconstructs from a bit level Boolean assignment to a solution in terms requested by the user. The assignment of Boolean variables is reassembled into full numeric/enumerated scalar values, arrays, and structs, which together constitutes a solution instance of the high-level CSP.

Figure 8:
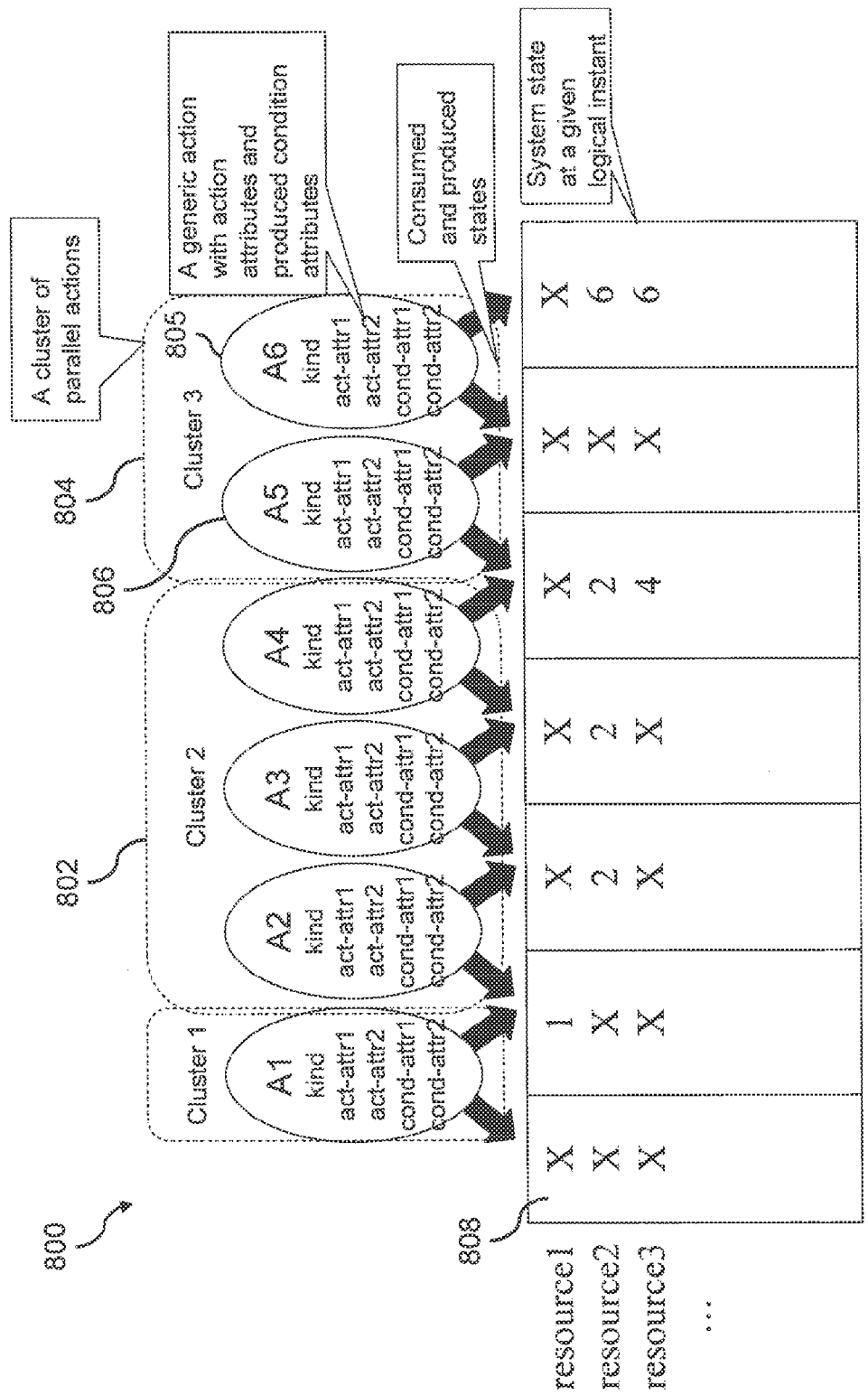
FIG. 8 is a simplified illustrative graphical representation of a constraint satisfaction problem (CSP) including a plurality of clustered actions requiring simultaneous execution, a plurality of system resources and their respective system states through time, and associated attributes and conditions of the actions in accordance with several embodiments of the present invention.

The high-level assignment 710 is then passed on to a front-end reconstruction reprocessing step 711 which will then generate a scenario plan data format 712 which may be a scheduling graph which is at least partially ordered, specifying at least which actions are to be clustered into simultaneous execution and, potentially, which actions must follow or wait for other actions. The front-end reconstruction 711 takes the data structure of the CSP in e-code or high-level assignment 710 and reconstructs the data structure in user terms, preferably, a bipartite graph of actions and conditions, each with their own respective attribute values. This may be performed using the meta-model constructed during the front-end translation step, reading it into the data-structure handed over from the back-end reconstruction. Then the scheduling graph in the scenario plan is constructed, illustratively through the following steps:

1) Collect under a same-time node results from the same action cluster (as seen in FIG. 8);
2) Add 'after' edge from producer action to its consumer action(s) for every stepwise condition interchange;
3) Add 'after' edge corresponding to an explicitly requested sequencing in the scenario specification; and,
4) Add 'after' edge between two actions that require the same resource (in random order).

After adding edges in steps 2-4, the canonical form of the graph is restored by reducing redundant edges and collapsing multiple same-time nodes into one.

The scenario plan data format 712 is suitable for generation of test code as it represents the concrete actions, attribute values, and scheduling relations therebetween. Several examples of such scenario plan data format 712 are shown in FIGS. 4, 5, and 6. The scenario plan data format 712 is then passed on to a C code generation node 713 which generates a C code test 714. The C code test 714 may then be passed on to a compiler or a generator of executable test code 715. The compiler or generator of executable code tests 715 generates an executable test 716 which may then be run at node 717 either on an actual physical implementation of a System on Chip (SOC) or Device under Test. Alternatively, the Device under Test or SOC may merely be simulated in a server or emulation program. Upon conclusion of the actual test execution, results 718 are output. Results 718 may include a series of snapshots of different system states, variables, attributes, or resources encountered throughout the execution of the test. Furthermore, the results 718 may indicate errors, problems, or conditions encountered throughout the test simulation.

FIG. 8 shows a high level constraint notation in Conjunctive Normal Form (CNF) diagram of a plurality of different actions such as actions 805 and 806 which are grouped into clusters 802 and 804 of parallel actions, which should be executed with a degree of simultaneity. Each action, such as 805 and 806, may have attributes, pre-conditions, produced conditions, or consumed and produced states (as shown in the system state graph 808) which tabulate resources of the system and their states in a pre and post condition corresponding to pre action and post action conditions.

Consumed and produced states are the pre and post conditions of an action. A user may declare in the system model that an action, for example (of type A) requires some condition, and/or provides some condition (say of type C, perhaps with some additional restrictions). These conditions are preferably explicitly associated in the user code with some system resource (a stream or a memory) accessible from the action's component. In the high-level CSP model, each of the resource instances are preferably represented as a sequence of values, each representing the state of that resource at a given (logical) "instant." The collective set of resource states at a given instant may be referred to as the system image, or snapshot. In this way, we may model the fact that action A requires (or consumes) condition C using a constraint relating the resource value in two consecutive instants if indeed the action that took place at that time is of type A.

FIG. 9 illustrates an exemplary transformation from a user SLN model, system design, scenario, or topology model 900, defining a plurality of different components, their resources, and actions, along with constraints, and conditions. A transformation 903, which corresponds with the front-end translation 703 of FIG. 7, results in a generated high-level constraint satisfaction problem (CSP), which is preferably in e-code 900'. The CSP 900' functionally mirrors and is created according to the user SLN model 900.

Another exemplary portion of an SLN, slightly modified from the portion in FIG. 9, where "port" has been replaced with "buff_pool" is provided below:

```
component Block2 {
  buff_pool: memory of Data;
  action A2 {
    input_buff: Data from buff_pool;
  };
};
```

It is seen that action A2 on component Block2 requires a condition of type Data to be taken from the component Block2's resource called buff_pool.

In the generated high-level CSP model, the corresponding constraint may be modeled as such:

```
keep for each (action_i) using index (i) in actions {
   ...
   action_i.kind in [b2_A2] =>
      images[i].b1_buff_pool0 not in [FREE, LOCKED]
      and images[i].b1_buff_pool 0 == images [i+ 1] .
b1_buff_pool0;
};
```

Where Kind b2_A2 represents action of type A2 being executed on a component called b2 (an instance of type Block2). We require that for every action of kind b2_A2 it should hold that the resource referenced from its block was not FREE or LOCKED (i.e. it contained condition of type Data) at that time, and because it is a "memory" resource (we also have "channel" resource), its state remains the same after the action is completed.

In general, the high-level CSP is the generic constraint model of a scenario. Only legal scenarios have an assignment to all the model's variables such that the model constraints are satisfied.

FIG. 10 is a simplified flow diagram illustrating a flow of processes for automatically generating executable system level tests in accordance with one exemplary embodiment of the present invention. At node 1002, a Device Under Test abstract, system design, or base model is provided. Such abstracted DUT may be provided in system level notation (SLN) or any other language capable of representing components, conditions, attributes, and constraints. The Device under Test (DUT) abstract 1002 is provided along with a scenario definition 1004. In an alternate embodiment, the DUT abstract 1002 and the scenario 1004 may be provided and considered in concert in an artificial intelligence means-ends analysis 1006 (however, this is preferably combined with the SAT solver or constraint solving engine in generating the Constraint Satisfaction Problem (CSP)) to combine and form a high level constraint satisfiability problem that considers scalar or user constraints (which may constrain data, attributes, or resources), along with timing, scheduling, or planning constraints (which may relate to the timing of the execution of separate actions), and finally, topology constraints encountered in the DUT or expressly provided in the scenario itself 1004. Once all of the three different types of constraints: planning, topology, and scalar have been considered, a constraint satisfiability problem CSP is solved at 1008. If the constraint satisfiability problem is not solvable—then, preferably, the SAT solver used to solve the CSP will return an error code.

A computer system for executing a verification environment in accordance with various embodiments of the present invention contains a processor unit, a main memory, an interconnect bus, a mass storage device, peripheral device(s), input control device(s), portable storage drive(s), a graphics subsystem, and an output display. The processor unit may include a single microprocessor or a plurality of microprocessors for configuring a computer system as a multi-processor system. The main memory stores, in part, instructions and data to be executed by the processor. The main memory preferably includes banks of dynamic random access memory (DRAM) as well as high-speed cache memory.

For the purpose of simplicity, the components of the computer system are connected via interconnect bus. However, the computer system may be connected through one or more data transport measures. For example, processor unit and main memory may be connected via a local microprocessor bus and mass storage device, peripheral device(s), portable storage medium drive(s), and graphic subsystem may be connected via one or more input/output (I/O) buses. A mass storage device, which may be implemented with a magnetic disk drive, an optical disk drive, a solid state device, or an attachment to network storage, is a non-volatile storage device for storing data, databases, designs, code, and instructions, to be used by the processor unit. In a software embodiment, the mass storage device may store the software to load it into main memory.

Portable storage medium drive operates in conjunction with a portable non-volatile storage medium such as a flash drive, floppy disk, a compact disk read only memory (CD-ROM), or a digital versatile disk read only memory (DVD-ROM), to input and output data and code to and from the computer system. In one embodiment, the software is stored on such a portable medium, and is input to the computer system via the portable storage medium drive. Peripheral device(s) may include any type of computer support device such as an input/output (I/O) interface, to add additional functionality to the computer system. For example, peripheral device(s) may include a network interface card to interface the computer system to a network. Peripheral device(s) may also include a schematic scanner unit to digitize a schematic drawing, a plotter device for printing large-scale design drawings, a 3d printer operable to construct a physical prototype of a device, a silicon mask printer, lithography prototyping equipment, FPGA testing interfaces for interfacing with an actual device, and the like.

Input control device(s) provide a portion of the user interface for a computer system. Input control device(s) may include an alphanumeric keypad for inputting alphanumeric and other key information; and a cursor control device such as a mouse, a track pad or stylus; or cursor direction keys.

In order to display textual and graphical information, the computer system contains a graphic subsystem and output display(s). Output display may include a cathode ray tube (CRT) display, liquid crystal display (LCD), plasma, projector, or an active matrix organic light emitting diode (AMOLED) display. The graphic subsystem receives textual and graphical information and processes the information for output to display.

In a software implementation, the EDA and/or Verification software includes a plurality of computer executable instructions, to be implemented on a computer system. Prior to loading in the computer system, the software may reside as encoded information on a computer-readable tangible medium such as a magnetic floppy disk, a magnetic tape, CD-ROM, DVD-ROM, flash memory, network file server, or any other suitable computer readable medium.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Thereby, test designers and verification engineers with minimal effort, errors, expended time, and reduced costs may have an automated system and method for automatically generating executable system level-tests from a partially specified scenario.

Although this invention has been described in connection with specific forms and embodiments thereof, it will be appreciated that various modifications other than those discussed above may be resorted to without departure from the spirit or scope of the invention. For example, equivalent elements may be substituted for those specifically shown and described, certain features may be used independently of other features, and in certain cases, particular combinations of circuit design and implementation flows or processing steps may be reversed, interposed, or combined, all without departing from the spirit or scope of the invention as defined in the appended Claims.

What is claimed is:

1. A method for automatically generating executable system-level tests from an initial action and a system design comprising:
    establishing a system design to include an interrelation of components, actions the components are operable to perform, and constraints relating to the performance of the actions;
    receiving at least an initial action from a user;
    generating a constraint satisfaction problem (CSP) including:
        automatically adding to the CSP a set of requisite actions to the initial action, wherein the set of requisite actions are added responsive to an evaluation of the system design to determine other actions required to perform the initial action; and,
        automatically adding to the CSP a set of constraints accumulated from the initial action and each action of the set of requisite actions;
    solving the CSP to thereby simultaneously satisfy the set of constraints;
    generating an executable system-level test by assembling the initial action and the set of requisite actions in an at least partial sequence responsive to a solution of the CSP, wherein the executable system-level test includes executable code operable to perform a verification test on a system represented by the system design.

2. The method as recited in claim 1, wherein the constraints of the system design constrain action sequencing, system topological element use, and data values; and the CSP is solved in a scheduling domain, system topology domain, and a data constraint domain.

3. The method as recited in claim 2, wherein the components, actions, and constraints in the system design are specified in one of e language, HDL, and system C.

4. The method as recited in claim 3, wherein the components of the system design include Integrated Circuits (IC) and processing core components.

5. The method as recited in claim 4, wherein the CSP is generated in e language, and is further translated into a Boolean notation format.

6. The method as recited in claim 5, wherein solving the CSP is accomplished by forming an array of successive system states and an array of successive actions constrained by the constraints limiting preceding and succeeding system states.

7. The method as recited in claim 6, further comprising executing the executable system-level test and recording successive system states throughout the execution of the test.

8. The method as recited in claim 7, wherein a test-bench receives output from the system design during the test and provides input thereto.

9. The method as recited in claim 8, wherein the initial action is a composite use-case modeling real-world operations of the system design.

10. The method as recited in claim 9, wherein the CSP is transmitted across a network to an external processing unit system, and solved thereon.

11. The method as recited in claim 5, further comprising collecting a plurality of solutions to the CSP, randomly selecting solutions, generating system-level tests therefrom, and executing each of the plurality of system-level tests.

12. A method for automatically generating executable system-level tests from a scenario and a system design comprising:
    establishing a system design, wherein the system design includes a plurality of components, actions the components are operable to perform, and constraints relating to the actions;
    creating an initial test scenario, the initial test scenario including at least one action to be performed on at least one component;
    accumulating a set of constraints relating to the initial test scenario and the system design;
    automatically generating an expanded test based on the system design and the initial test scenario, wherein the expanded test satisfies the set of constraints;
    generating an executable test code based on the expanded test, wherein the executable test code is operable to perform at least one simulation on a processor.

13. The method as recited in claim 12, wherein constraints functionally limit at least one of: actions and attributes of actions.

14. The method as recited in claim 12, wherein attributes functionally modify actions.

15. The method as recited in claim 12, wherein constraints functionally limit input and output of actions.

16. The method as recited in claim 12, wherein the components, actions, attributes, and constraints in the base model are specified in one of e language, HDL, and system C.

17. The method as recited in claim 12, wherein the components of the system design include Integrated Circuit (IC) elements and processing cores.

18. The method as recited in claim 12, wherein the expanded test is generated in e language, and is further translated into a Boolean notation format.

19. The method as recited in claim 12, wherein the expanded test is generated by forming an array of successive system states and an array of successive actions constrained by the constraints limiting preceding and succeeding system states.

20. The method as recited in claim 12, further comprising executing a test defined by the executable test code and recording successive system states throughout the execution of the test.

21. The method as recited in claim 20, wherein a test-bench receives output from the executing test and provides input thereto.

22. The method as recited in claim 12, wherein the initial test scenario represents a composite use-case modeling real-world operations of the system design.

23. The method as recited in claim 12, wherein the expanded test is generated with an external processing unit.

24. The method as recited in claim 12, further comprising generating a set of expanded tests and executing each of the set of expanded tests.

25. A system for automatically generating executable system-level tests from an initial action and a system design comprising:
    a storage module storing at least one system design including a plurality of interrelated components, actions the components are operable to perform, and constraints related to the performance of the actions;
    a computer processing unit operably coupled to the storage module, the processing unit including:
        a test elaboration module operable to (a) determine relationships between an initial action and necessary complement actions of the system design in the storage module, (b) form a set of constraints related to both the initial action and the necessary complement actions, and (c) generate a constraint satisfaction problem (CSP) relating to the initial action, necessary complement actions, and the set of constraints related thereto;
        a constraint solver module operable to evaluate and solve the CSP to form an elaborated test including an at least partial arrangement of actions and parameters thereto, wherein the elaborated test satisfies the set of constraints; and,
        an executable compiler module operable to generate executable test code from the test scenario, the executable test code being executable on a processing unit to perform a simulation of a plurality of actions on the design.

26. The system as recited in claim 25, wherein the system design represents an integrated circuit device including a plurality of interrelated integrated circuit components.

27. The system as recited in claim 25, wherein the computer processing unit is coupled to the storage module via a computer network.

28. The system as recited in claim 25, wherein the test elaboration module includes a means-end analysis module utilizing artificial intelligence to determine dependence relationships between at least one initial action and necessary complement actions related thereto.

29. The system as recited in claim 25, further comprising a simulation module operable to execute the executable test code.

30. The system as recited in claim 29, further comprising a reporting module, operable to capture states of the simulation module during execution of the executable test code; the reporting module being further operable to report results of the simulation module including errors encountered.

* * * * *